US012095885B2

(12) United States Patent
Wang et al.

(10) Patent No.: US 12,095,885 B2
(45) Date of Patent: Sep. 17, 2024

(54) METHOD AND APPARATUS FOR REMOVING STALE CONTEXT IN SERVICE INSTANCES IN PROVIDING MICROSERVICES

(71) Applicant: Hong Kong Applied Science and Technology Research Institute Company Limited, Hong Kong (HK)

(72) Inventors: Xiaodong Wang, Hong Kong (HK); Qinghua Liao, Shenzhen (CN)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 255 days.

(21) Appl. No.: 17/960,778

(22) Filed: Oct. 5, 2022

(65) Prior Publication Data
US 2024/0121321 A1 Apr. 11, 2024

(51) Int. Cl.
G06F 15/16 (2006.01)
H04L 67/289 (2022.01)
H04L 67/63 (2022.01)

(52) U.S. Cl.
CPC ............ H04L 67/63 (2022.05); H04L 67/289 (2013.01)

(58) Field of Classification Search
CPC .............................. H04L 67/63; H04L 67/289
USPC ........................................................ 709/201
See application file for complete search history.

(56) References Cited

U.S. PATENT DOCUMENTS

| 8,904,117 | B1 | 12/2014 | Kalekar et al. |
| 9,716,617 | B1 * | 7/2017 | Ahuja ................ H04L 41/0803 |
| 10,148,504 | B2 * | 12/2018 | Ahuja ................... G06F 21/554 |
| 10,466,990 | B1 * | 11/2019 | McCluskey ............... G06F 8/20 |

(Continued)

FOREIGN PATENT DOCUMENTS

| CN | 102771178 A | 11/2012 |
| CN | 111274111 A | 6/2020 |

(Continued)

OTHER PUBLICATIONS

International Search Report and Written Opinion of corresponding PCT Patent Application No. PCT/CN2022/125694 dated Jun. 10, 2023.

(Continued)

*Primary Examiner* — Alicia Baturay
(74) *Attorney, Agent, or Firm* — Idea Intellectual Limited; Margaret A. Burke; Sam T. Yip

(57) ABSTRACT

A method for removing stale context in a service instance, comprising: generating a user message according to UID and request instruction of received request data; routing the user message to first service instance; if target context corresponding to the user ID is saved in a global cache of a database, loading the target context from the global cache; when the loaded target context does not belong to the first service instance, setting the loaded target context to belong to the first service instance, wherein the set target context is saved into a first local cache and the global cache; and instructing to remove one or more invalid target contexts corresponding to the user ID from one or more other service instances, wherein the invalid target contexts are target contexts which do not belong to the first service instance, such that stale contexts which are the invalid target context are removed.

15 Claims, 10 Drawing Sheets

(56) References Cited

U.S. PATENT DOCUMENTS

| | | | |
|---|---|---|---|
| 10,498,601 B2 | 12/2019 | Ahuja et al. | |
| 10,678,899 B2* | 6/2020 | Keret | G06F 21/32 |
| 10,713,153 B1* | 7/2020 | McCluskey | G06F 11/3688 |
| 10,735,394 B2 | 8/2020 | Gupta et al. | |
| 10,824,462 B2* | 11/2020 | Pasupathy | G06F 9/45533 |
| 10,824,559 B2* | 11/2020 | Khan | G06F 3/061 |
| 10,956,849 B2* | 3/2021 | Wu | H04L 41/5025 |
| 11,010,305 B2* | 5/2021 | Khan | G06F 12/084 |
| 11,057,393 B2* | 7/2021 | Coffing | G06Q 20/40 |
| 11,121,943 B2* | 9/2021 | Eberlein | H04L 41/5054 |
| 11,170,088 B2* | 11/2021 | Keret | G10L 25/51 |
| 11,226,845 B2* | 1/2022 | Hintermeister | G06F 9/5027 |
| 11,243,755 B1* | 2/2022 | Lanner | G06F 8/65 |
| 11,258,874 B2* | 2/2022 | Walsh | H04L 67/564 |
| 11,283,635 B2* | 3/2022 | Smith | H04L 9/0866 |
| 11,386,382 B1* | 7/2022 | Dhawan | H04M 3/2218 |
| 11,425,028 B2* | 8/2022 | Singh | H04L 45/26 |
| 11,451,601 B2* | 9/2022 | Jónsson et al. | G06F 9/542 |
| 11,561,802 B2* | 1/2023 | Mansour | G06F 11/1415 |
| 11,563,636 B1* | 1/2023 | Kairali | H04L 67/562 |
| 11,588,820 B2* | 2/2023 | Guilford | H04L 63/0823 |
| 11,593,084 B2* | 2/2023 | Dinh | G06F 8/65 |
| 11,599,397 B2* | 3/2023 | Ramachandran | G06F 8/316 |
| 11,614,989 B2* | 3/2023 | Hwang | G06F 40/40 714/47.3 |
| 11,621,945 B2* | 4/2023 | Pollutro | H04L 9/0819 713/155 |
| 11,641,665 B2* | 5/2023 | Helms | H04W 72/535 370/329 |
| 2019/0095241 A1 | 3/2019 | Ago et al. | |
| 2020/0244638 A1 | 7/2020 | Gupta et al. | |
| 2021/0126871 A1* | 4/2021 | Bonas | H04L 67/56 |
| 2021/0297318 A1* | 9/2021 | Chatterjee | H04L 41/5009 |
| 2021/0359955 A1 | 11/2021 | Musleh et al. | |
| 2021/0390084 A1* | 12/2021 | Forsythe, Jr. | G06F 9/3005 |
| 2022/0092512 A1* | 3/2022 | Dhawan | G06Q 10/06398 |
| 2022/0103694 A1* | 3/2022 | Mani | H04M 15/43 |
| 2022/0116445 A1* | 4/2022 | Filippou | H04L 41/0853 |
| 2022/0164186 A1* | 5/2022 | Pamidala | G06F 9/5088 |
| 2022/0245647 A1* | 8/2022 | Dhawan | G06N 20/00 |
| 2022/0253347 A1* | 8/2022 | Jones | G06F 9/5055 |
| 2022/0318060 A1* | 10/2022 | Choochotkaew | G06F 9/5005 |
| 2022/0327006 A1* | 10/2022 | Makhija | G06N 20/00 |
| 2022/0382522 A1* | 12/2022 | Heynemann Nascentes da Silva | G06F 8/65 |
| 2023/0077708 A1* | 3/2023 | Jiang | G06F 9/5077 709/226 |
| 2023/0083701 A1* | 3/2023 | Wang | G06F 11/3428 |
| 2023/0087478 A1* | 3/2023 | Jayaram | G06Q 40/04 705/37 |
| 2023/0088581 A1* | 3/2023 | Wilson | H04L 41/147 709/226 |
| 2023/0103761 A1* | 4/2023 | MacGaffey | G06F 9/54 719/328 |
| 2023/0119552 A1* | 4/2023 | Doshi | H04L 47/783 709/226 |
| 2023/0123350 A1* | 4/2023 | Panikkar | G06F 9/5083 718/105 |

FOREIGN PATENT DOCUMENTS

| | | |
|---|---|---|
| WO | 2021201655 A1 | 10/2021 |
| WO | 2022188589 A1 | 9/2022 |

OTHER PUBLICATIONS

Maryna Demchenko, "Microservices vs. Monolithic: Which Architecture Suits Best for Your Project?", Monolithic Architecture vs Microservice Architecture Compared | NCube, Apr. 28, 2020.

Jimmy Song, "Service Mesh—The Microservices in Post Kubernetes Era", https://jimmysong.io/en/blog/service-mesh-the-microservices-in-post-kubernetes-era/, Apr. 1, 2020.

"What is the 5G Service-Based Architecture (SBA)?", https://www.metaswitch.com/knowledge-center/reference/what-is-the-5g-service-based-architecture-sba, Metaswitch, 2022.

* cited by examiner

METHOD AND APPARATUS FOR REMOVING STALE CONTEXT IN SERVICE INSTANCES IN PROVIDING MICROSERVICES

FIELD OF THE INVENTION

The present invention relates to techniques of removing stale context. More particularly, the present invention relates to methods and systems for removing stale context in a service instance during auto-scaling in a microservice.

BACKGROUND OF THE INVENTION

Referring to FIG. 1A, in wireless communications, traditional applications were often designed to support monolithic architecture ST10. However, nowadays more and more applications are designed with microservice architecture. For large-scale systems, if scalability, upgradability, high availability, etc. are required, the microservice architecture ST11 is a better option. To deliver cloud-native service-based architecture 5G core with high performance, service mesh and session affinity techniques are often used. Local cache in each instance may be used for improving accessing speed. Since the local cache in an instance can become stale during auto-scaling, the microservice service instance can generate incorrect results because context in the instance is outdated.

The communication among distributed microservices is more complex than that with monoliths. Traditional load balancer for microservices has some weak points, e.g., difficult to handle http2 long connection, single point of failure, performance bottle neck, etc. Service mesh is a communication layer among services that handles peer data traffic among microservices. It simplifies the communication management among services.

Furthermore, high performance systems often use session affinity algorithms for load balancing, so as to keep the same user with a relatively fixed instance during a session that may include many sequential requests and responses.

Service mesh uses a sidecar proxy as a distributed load balancer for each service instance, so as to make it easy to scale out and has no single point of failure.

Referring to FIG. 1B, the service mesh typically uses a consistent hashing algorithm, such as a hash ring HR10, for destination instance selection, where the target addresses and the user identities are put evenly in the hash ring HR 10 by their hash values (e.g., 0-9). Hash value of the user identity for each message is used to determine which instance the message is to be routed to. During a scaling-out operation, the hashing ring HR10 becomes the hashing ring HR11 after adding a new Instance D, such that the same user with hash value 9 and 0 is routed to Instance D instead of Instance A. During a scaling-in operation, the hashing ring HR11 becomes hashing ring HR10 by removing the added Instance D, such that the user (with hash value 9 and 0) is routed back to Instance A rather than removed Instance D.

However, when adding or removing instances, 1/N number of users' target instances become different from the rest, where N is the instance number. The same user's contexts stored in the local caches would then exist in multiple instances and would become staled after the scaling-out and scaling-in operations. In other words, although the session affinity for service mesh can improve the performance but it also introduces possibility of having stale cache in the auto-scaling process.

To deliver the promise of 5G for high performance, service mesh and session affinity are used. Specifically, since single load balancer becomes a performance bottleneck for hotspot services and is potentially a single point of failure, and the service mesh is provided as a solution to this problem. Furthermore, 5G user equipment has many kinds of context, e.g., security, session, access, mobility, subscription, quality of service, etc., and the loading of these contexts frequently slows down the entire service processing. Accordingly, session affinity and local cache disposed in the service instance are provided for solving this problem. In short, for delivering cloud-native service-based architecture 5G core services, while the service mesh and session affinity techniques can be used to ensure high performances, but at the same time the aforementioned stale context problem is introduced.

Therefore, there is a need in the art to remove stale cache in service instance of 5G service-based architecture using microservices, service mesh with session affinity and local cache during auto-scaling, so as to prevent possible error event occurred because of the stale context stored in local cache of the service instance.

SUMMARY OF THE INVENTION

In accordance to one aspect of the present invention, a computer-implemented method for removing stale context in a service instance providing a microservice by a server to an electronic device is provided. The method includes: receiving, by a processor of the server, a request data from the electronic device, wherein the request data comprising a UID and a request instruction; generating, by the processor, a user message according to the UID and the request instruction, wherein the user message includes a user ID corresponding to the UID; routing, by the processor, the user message to a first service instance of the microservice, wherein the first service instance subscribes an event notification; determining whether a target context corresponding to the user ID is saved in a first local cache of the first service instance, when the target context corresponding to the user ID is not saved in the first local cache of the first service instance, determining, by the processor, whether a target context corresponding to the user ID saved in a global cache residing in a database, wherein if the target context corresponding to the user ID is not saved in the global cache residing in the database, creating, by the processor, the target context based on the user message; and setting, by the processor, the created target context to belong to the first service instance, wherein the target context is saved into a first local cache of the first service instance and into the global cache residing in the database; else if the target context corresponding to the user ID is saved in the global cache residing in the database, loading, by the processor, the target context from the global cache. Then, determining, by the processor, whether the loaded target context belongs to the first service instance, wherein when the loaded target context does not correspond the first service instance, setting, by the processor, the loaded target context to belong to the first service instance, wherein the set target context is saved into the first local cache and into the global cache residing in the database; and instructing, by the processor, to remove one or more invalid target contexts corresponding to the user ID from one or more other service instances, wherein the invalid target contexts are target contexts which do not belong to the first service instance, such that stale contexts which are the invalid target context are removed.

In accordance with another aspect of the present invention, a server apparatus for removing stale context in a service instance providing a microservice by the server apparatus to an electronic device is provided, and the server apparatus includes one or more processors configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, methods and apparatuses for removing stale context in a service instance providing a microservice and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
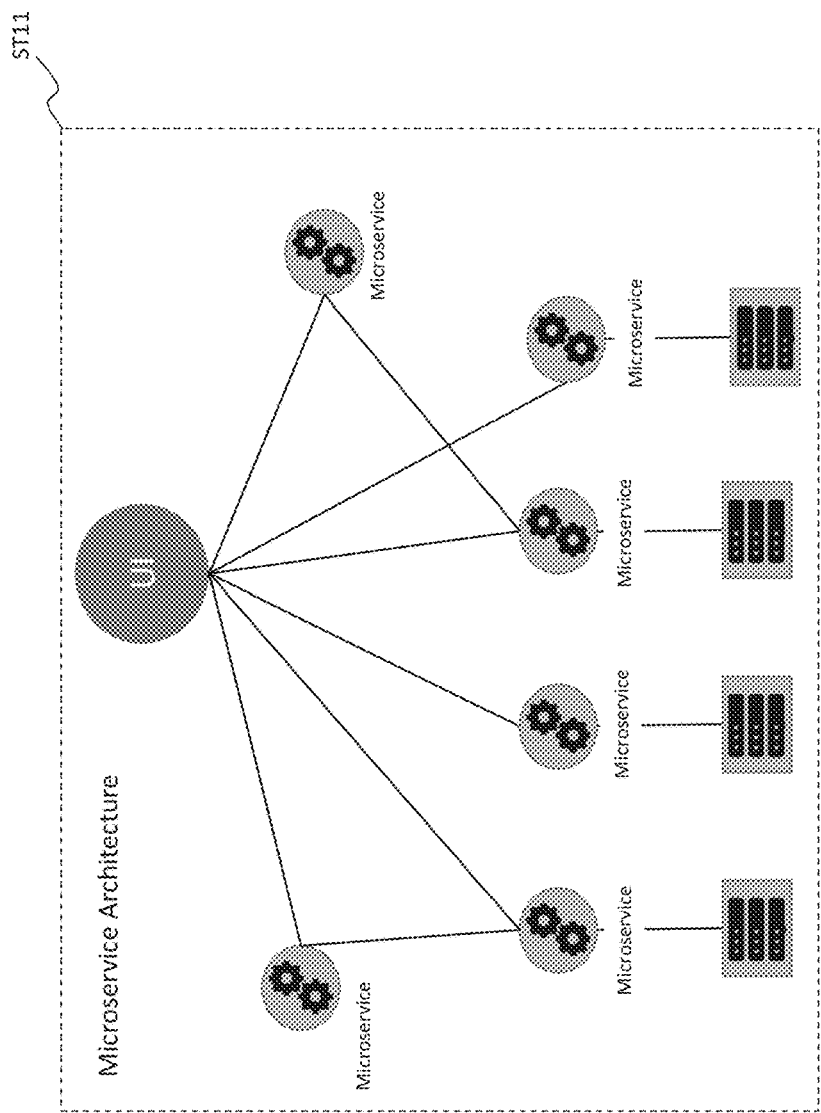
FIG. 1A depicts a schematic diagram illustrating monolithic architecture and microservice architecture.
Figure 1A:
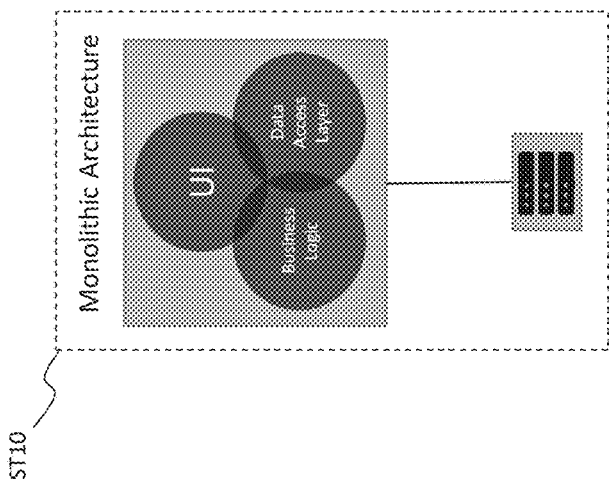
Figure 1B:
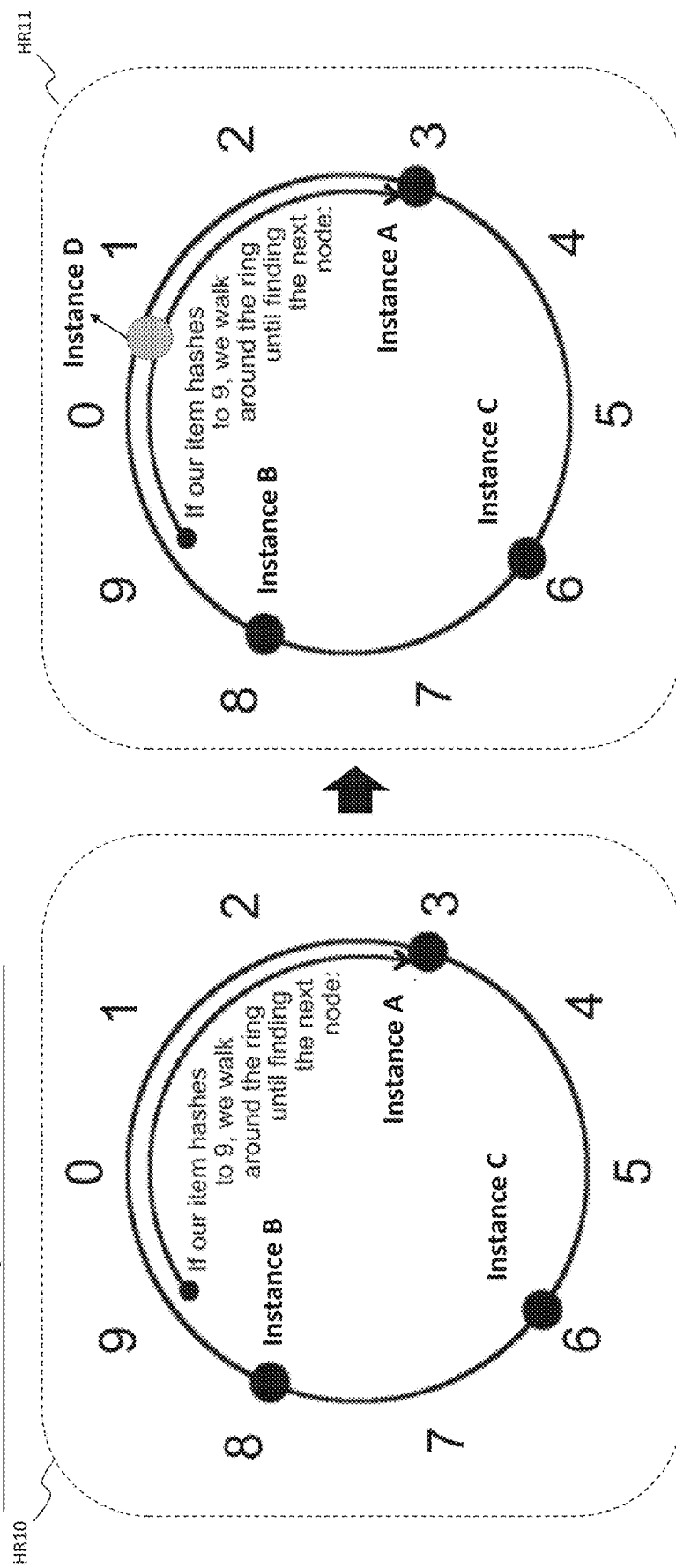
FIG. 1B depicts a schematic diagram illustrating session affinity for service mesh.
Figure 1B:
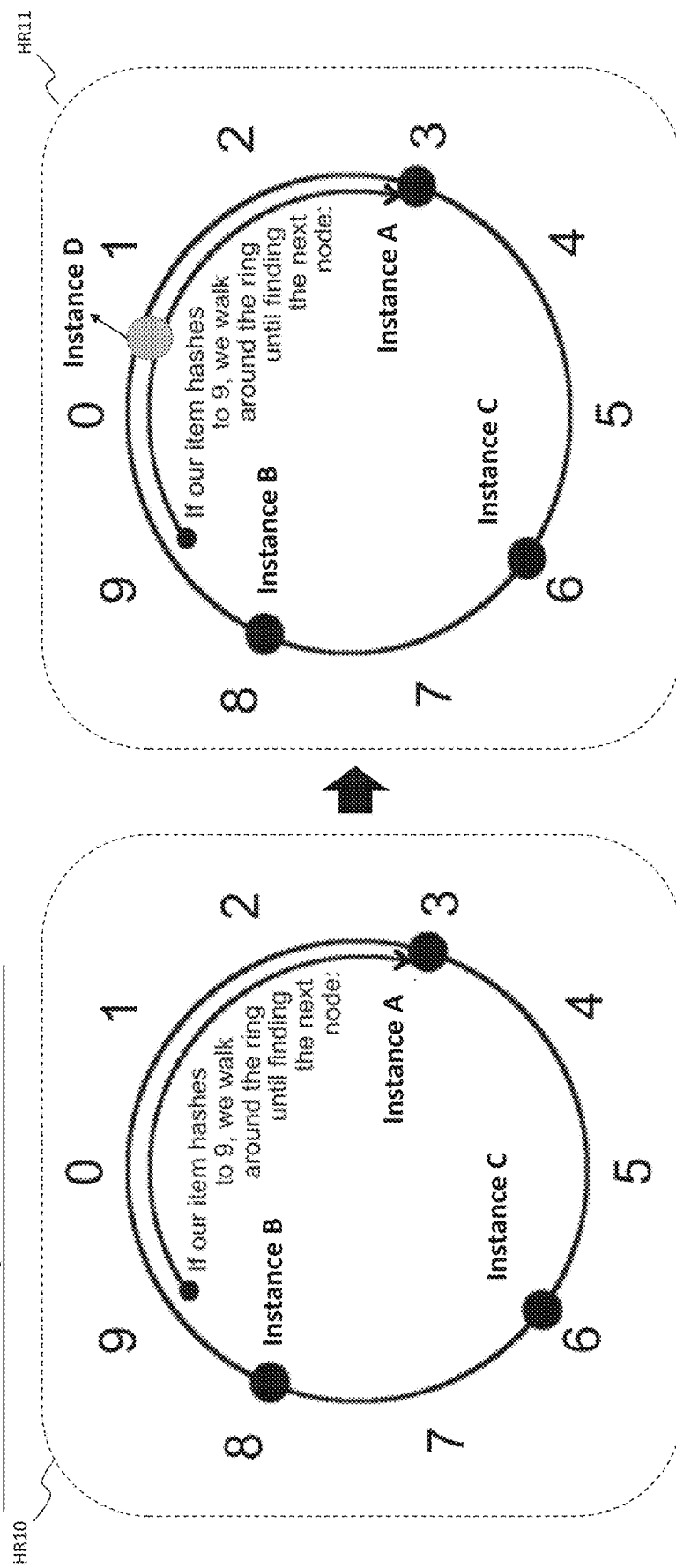
Figure 2:
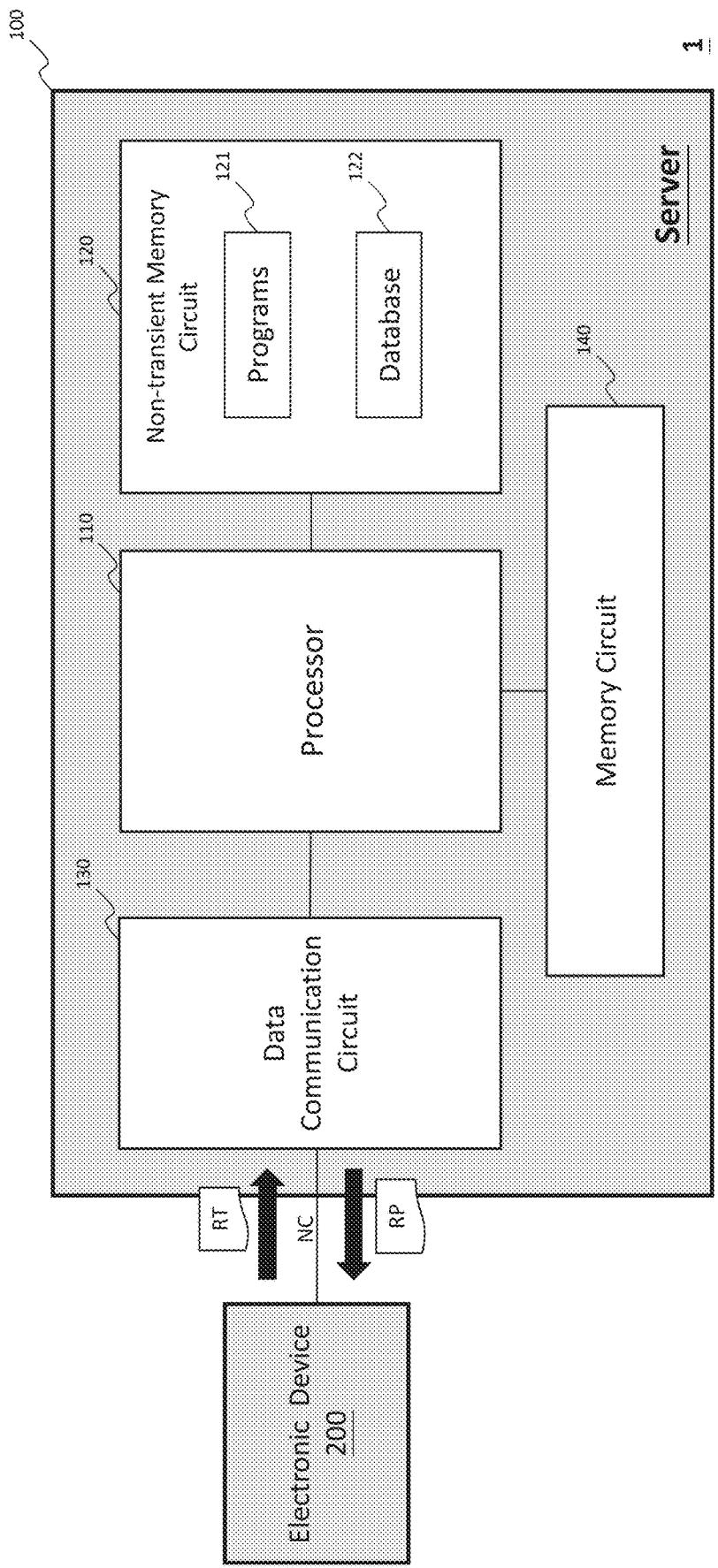
FIG. 2 depicts a block diagram illustrating a system including a server and an electronic device in accordance with one embodiment of the present invention.

Referring to FIG. 2 for the following description. In accordance with various embodiments of the present invention, system 1 includes a server 100 and one or more electronic device 200. The electronic device 200 can be, for example, a mobile computing device, smartphone, personal computer, another server, or workstation terminal. The electronic device 200 is configured to send request data to the server 100. The request data contains at least a unique identifier (UID) of the request and a request instruction, which is used for requesting the server to provide the related service according to the request data, so as to send back response data to the electronic device 200. The server includes a processor 110, a non-transient memory circuit 120, a data communication circuit 130 and a memory circuit 140.

The non-transient memory circuit 120 is configured to store programs (or machine instructions) 121 and to host the database 122. The database 122 includes a global cache GC. The global cache is configured to preserve data sent from service instance or other kinds of data. Data saved in the global cache GC can also be retrieved by a service instance. In addition, the global cache GC stores the latest contexts for all the users.

The data communication circuit 130 is configured to establish a network connection NC between the server 100 and the electronic device 200. The server 100 can receive request data RT from the electronic device 100 via the established network connection NC, and send a corresponding response data RP to the electronic device 200.

The memory circuit 140 is configured to temporarily store data/programs/applications (e.g., load balancer, service instance, service provider related to the microservice/service provided by the server 100) executed by the processor 110. For example, in this example embodiment, the memory circuit 140 can be Dynamic Random Access Memory (DRAM), Static Random Access Memory (SRAM), or other suitable electronic memory circuitry.

In the embodiment, the provided service architecture includes one or more executed load balancers, one or more executed service providers, and the database 122. Each of the load balancer is configured to route a received user message to a service instance provided by one of the service providers. The user message is generated according to the UID and the request instruction of a received request data, and the user message includes a user identifier corresponding to the UID. There are more than one load balancers, each for a service provider and performs service instance selection based on an algorithm to distribute the user message.

Each service instance is configured to process the received user message and execute a corresponding service according to the received user message and generate/update a context corresponding to the user message according to the result of the executed service. Furthermore, each service instance subscribes to an event notification. The event notification can be published by the database 122 or/and other service instance. In one embodiment, the service instance subscribes to the global cache residing in the database when adding/connecting to the service mesh.

Figure 3:
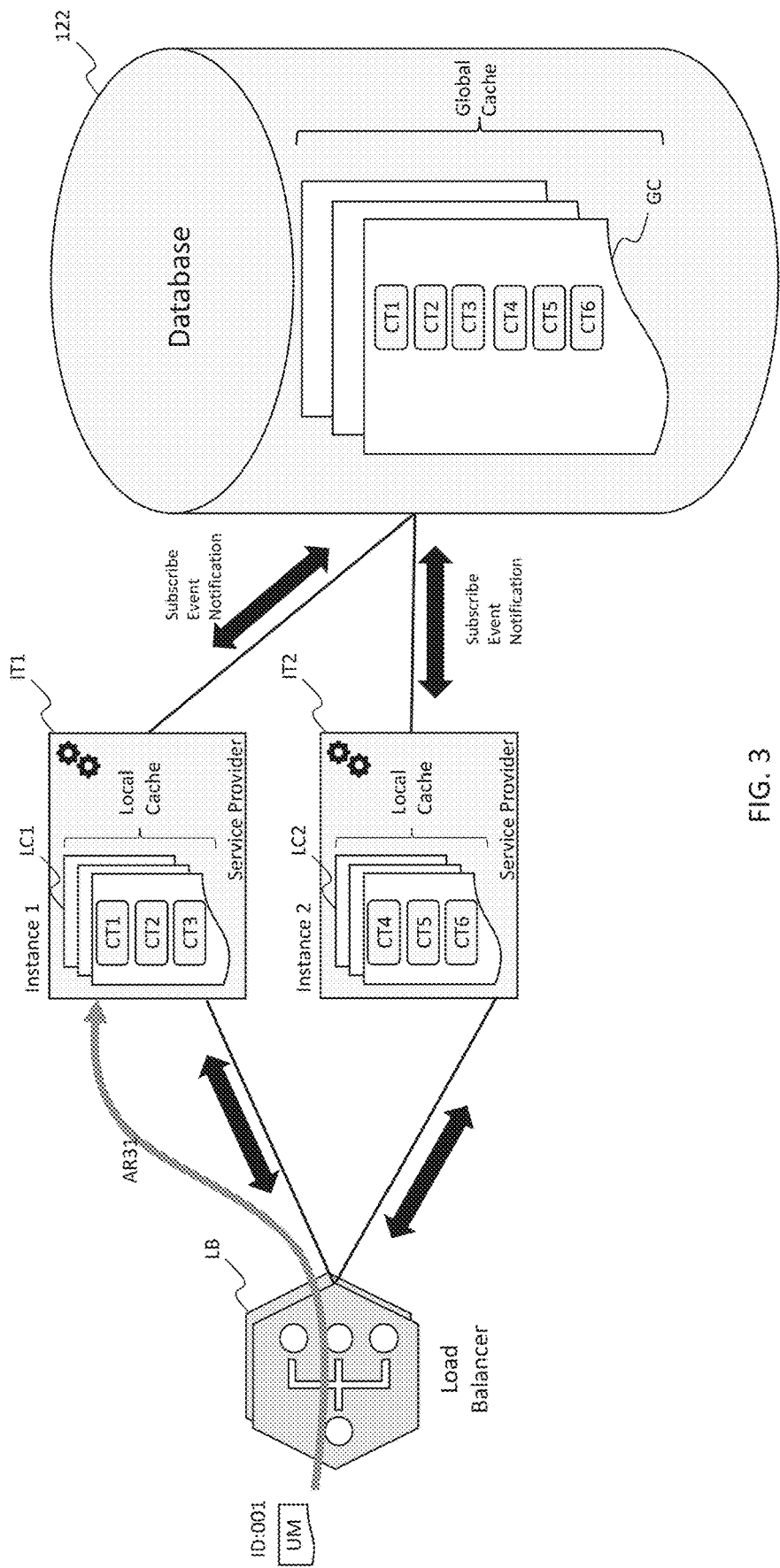
FIG. 3 depicts a schematic diagram illustrating a provided architecture having load balancer, service instances and database managed by the provided server.

Referring to FIG. 3, for example, assuming that the load balancer LB is routing a user message UM having a user ID "001" to a first service instance IT1 (as indicated by arrow AR31). The existing service instances IT1 and IT2 subscribe to an event notification from the database 122. The service instances have local caches LC1 and LC2. Each of the local cache is used to save the context data (e.g., contexts CT1 to CT3 are saved in the local cache LC1, and contexts CT4 to CT6 are saved in the local cache LC2). In this example, context CT1 corresponds to the user message of user ID 001. The global cache GC stores copies of the contexts CT1 to CT6, which are synchronized with contexts stored in the local caches LC1 and LC2. A service instance may load (or retrieve) from the global cache GC the context corresponding to a received user message.

The processor 110 executes the machine instructions 121 to implement methods provided by the presented disclosure.

Figure 4:
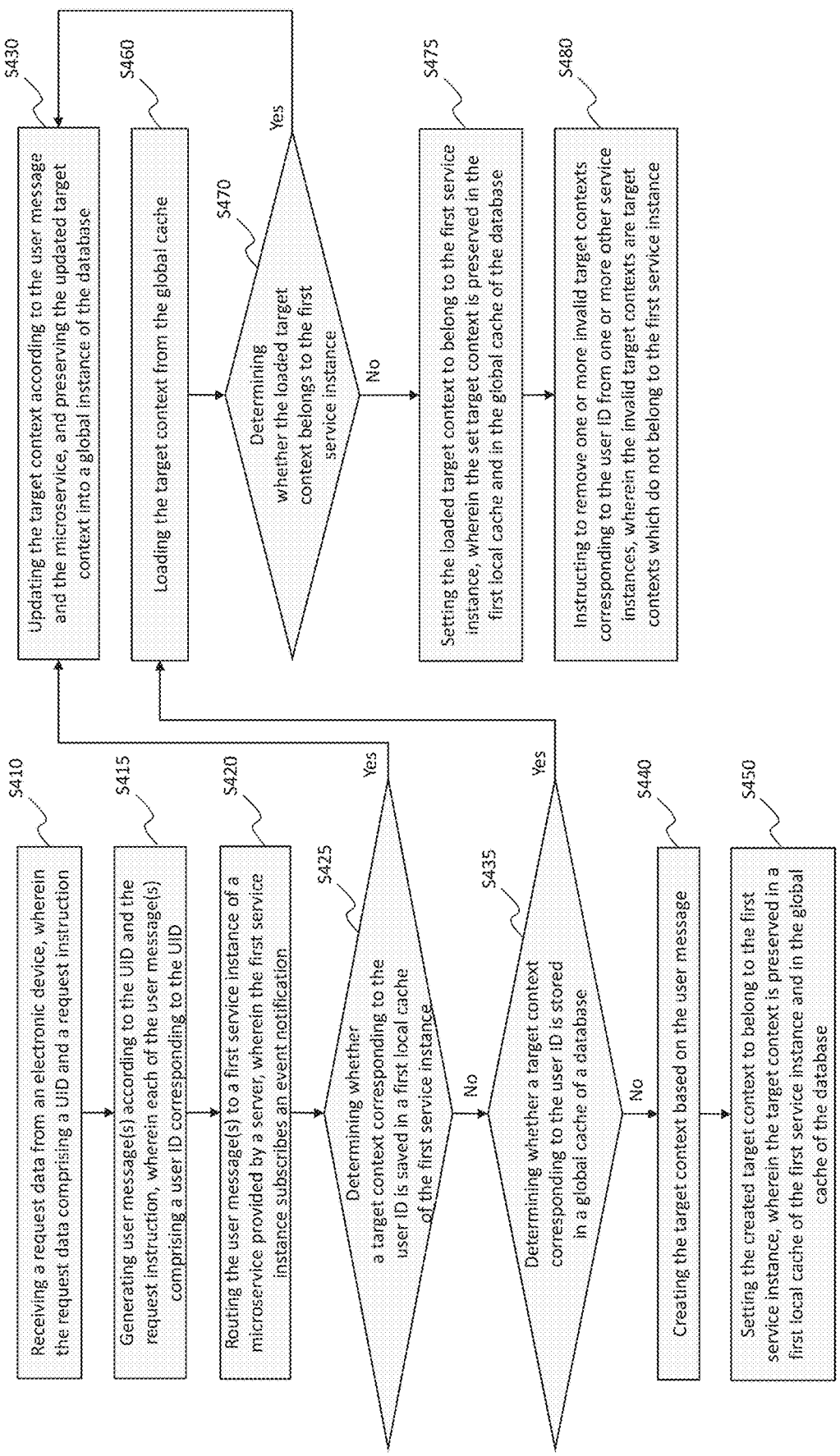
FIG. 4 depicts a flowchart of removing stale context in a service instance.

Referring to FIG. 4, in step S410, the processor 110 receives a request data RT from an electronic device 200, wherein the request data comprising a UID and a request instruction.

Next, in step S415, the processor 110 generates one or more user messages UM according to the UID and the request instruction, wherein each of the user message(s) UM comprises a user ID corresponding to the UID. Thus, the user message(s) UM are specific to the user of the user ID, the user message(s) UM are to be processed in the received order by a service instance providing the microservice.

Next, in step S420, the processor 110 routes the user message(s) UM to a first service instance of a microservice provided by the server 100. The first service instance subscribes to an event notification. The notification is provided by another service instance via the database's subscribe/publish channel. The processor 110 routes the user message(s) UM to the first service instance via the executed load balancer.

Specifically, in a service mesh, each service instance is attached a sidecar proxy as the distributed load balancer. Each load balancer works independently and uses a consistent hashing algorithm to route user messages to the same destination when the selection conditions on the user messages are the same.

In the microservice architecture, applications (or business functions) are created as separate components and individual applications are executed as services. These services communicate with each other through well-defined lightweight application programming interfaces (APIs). During runtime, each service spawns one or more service instances, which are running copies of the service logic of the service. Furthermore, each of the service instances is a stateless, has its own local cache, and can be replaced by each other. This is important for service scalability and online upgrading.

Next, in step S425, the processor 110 determines whether a target context corresponding to the user ID is saved in a first local cache of the first service instance. If the target context corresponding to the user ID is preserved in the first local cache of the first service instance, then continues to step S430; else if the target context corresponding to the user ID is not preserved in the first local cache of the first service instance, then continues to step S435. The context having information indicating the user ID of the received user message is referred to as the target context.

Specifically, to avoid frequently retrieval of the same data from the global cache residing in the database by different instances, which is resource intensive and with long latency, the load balancer is configured with the bias to route user messages of the same user to the same service instance and keep the corresponding user context in the local cache. Therefore, while the first service instance receives the user message, the first service instance executed by the processor 110 checks if a context corresponding to user of the user message exists in the local cache of the first service instance first. The context and the user message may contain ID information indicating the related user (e.g., user ID or other types of ID), and the processor 110 determines which one context matches to which one user message when the said one context and the said one user message are related to the same user (e.g., have the same user ID).

In many cases, a user using the service has its own context which is stateful. These contexts can be stored in the global cache to keep the service instances stateless.

As shown by FIG. 4, in step S430, the processor 110 updates the target context according to the user message and the microservice, and preserving the updated target context in the global cache. In other words, the updated target context is preserved in the first local cache, and then stored in the global cache synchronously. The processor 110 generates response data according to the updated target context, and then sends the response data to the electronic device 200.

On the contrary, if the target context corresponding to the user ID is not preserved in the first local cache, in step S435, the processor 110 determines whether a target context corresponding to the user ID is stored in a global cache. For example, the processor 110 search the global cache for the target context according to the ID information (e.g., user ID) of the user message. That is, the processor 110 can load the target context from the global cache.

If the target context corresponding to the user ID is not stored in the global cache (step S435→No), in step S440, the processor 110 creates the target context based on the user message.

Next, in step S450, the processor 110 sets the created target context to belong to the first service instance, wherein the target context is preserved in a first local cache of the first service instance and in the global cache. Specifically, the process step of setting the created target context to belong to the first service instance includes: identifying an Instance ID (IID) of the first service instance; and setting the owner attribute of the created target context by the IID of the first service instance.

In one embodiment, a context may contain metadata or auxiliary data which is configured to store information or one or more setting attributes/parameters for authentication process, identification process. For example, when the processor 110 generates the target context in the first service instance, the processor 110 identifies an Instance ID (IID) of the first service instance, and sets an owner attribute of the target context based on the IID of the first service instance. In other words, the processor 110 records which instance generated the target context via the owner attribute of the target context, such that the processor 110 may avoid possible error occurred by the owner attribute.

If the target context corresponding to the user ID is stored in the global cache (step S435→Yes), in step S460, the processor 110 loads the target context from the global cache to the first service instance.

Next, in step S470, the processor 110 determines whether the loaded target context belongs to the first service instance. Specifically, the processor 110 identifies the Instance ID (ID) of the first service instance, identifying a content of an owner attribute of the loaded target context and determines whether the content of the owner attribute of the loaded target context is the IID of the first service instance.

If the content of the owner attribute of the loaded target context is the IID of the first service instance, then the processor 110 determines that the loaded target context belongs to the first service instance; else if the content of the owner attribute of the loaded target context is not the IID of the first service instance, then the processor 110 determines that the loaded target context does not belong to the first service instance.

If the loaded target context belongs to the first service instance (step S470→Yes), then continues to step S430, the processor 110 updates the loaded target context according to the user message and the microservice, and stored the updated target context in the global cache.

Otherwise, if the loaded target context does not belong to the first service instance (step S470→No), then continues to step S475, the processor 110 sets the loaded target context to belong to the first service instance, wherein the set target context is preserved in the first local cache and the global cache.

Specifically, the process step of setting the loaded target context to belong to the first service instance includes: identifying the IID of the first service instance; and setting the owner attribute of the loaded target context by the IID of the first service instance.

In other words, when the first service instance determines that it is not the owner of the loaded target context (e.g., the target context's owner attribute is not the IID of the first service instance), the first service instance sets the updated target context's owner as the first service instance (e.g., by replacing the content of the owner attribute of the target context with the IID of the first service instance) and then further updates the loaded target context according to the user message and the microservice. Then, the updated and set target context belonging to the first service instance is preserved in the first local cache and the global cache. The outdated target context in the global cache GC is then replaced/updated by this updated and set target context belonging to the first service instance. That is the target context in the global cache is updated as the latest valid target context by the synchronization.

Next, in step S480, the processor 110 instructs to remove one or more invalid target contexts corresponding to the user ID from one or more other service instances, wherein the invalid target contexts are target contexts which do not belong to the first service instance. That is, the invalid target contexts being the stale contexts are removed by the foregoing steps.

Specifically, the process step of instructing to remove the invalid target contexts corresponding to the user ID from the other service instances includes: publishing a notification event related to the target context corresponding to the user ID to all other service instances, wherein the notification event indicating that the target context not belonging to the first service instance is invalid; and for each service instance that is having the invalid target context, after receiving the notification event, removing the invalid target context from a local cache of that service instance.

In more details, the process step of publishing the notification event related to target context corresponding to the user ID to all other service instances includes: sending the notification event to the database; and forward the notification event to all other service instances (because the service instances are subscribed the event notification), such that the other service instances and the database do not have the invalid target context, and stale contexts which are the invalid target context are removed from the microservice architecture.

In an embodiment, the notification mechanism includes a subscribe process, a publish process and a notify process. During the subscribe process, each of the service instances subscribes to an event notification with the database and/or with each other. During the publish process, when a service instance needs to update a target context by its IID, this service instance publishes this notification event indicating that target context not belonging to this service instance is invalid to database or to other service instances. During the notify process, the database notifies all other subscribed instances with a removal event after receiving the published notification event, so as to remove all invalid target context existed in one or more other service instance.

Figure 5:
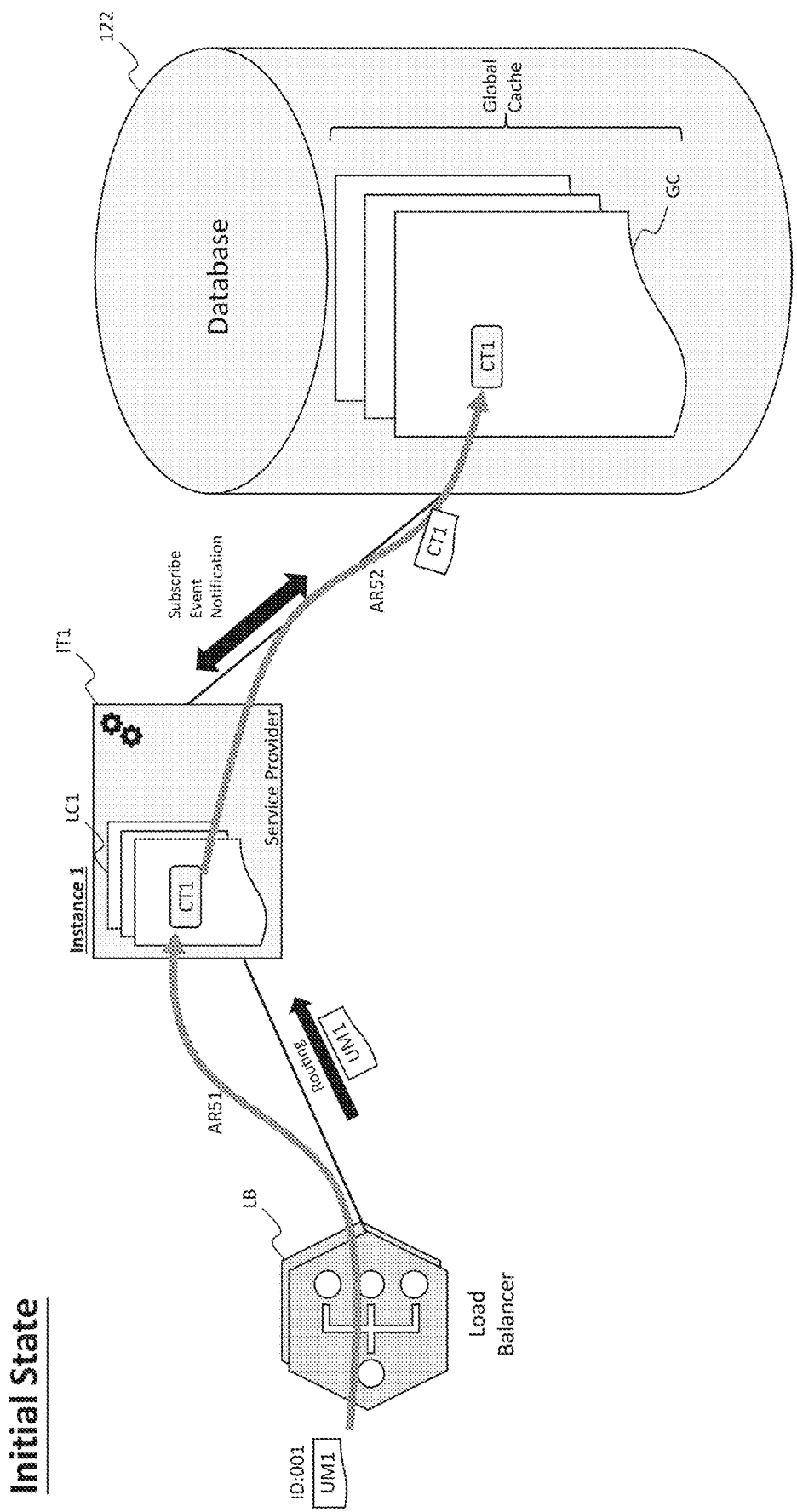
FIG. 5 depicts a schematic diagram illustrating interactivities performed between load balancer, service instances and database during the initial state operation.

Referring to FIG. 5, during the initial state operation:
(1) Each service instance (e.g., the first service instance IT1) subscribes to the event notification with the database (e.g., by a command "psubscribe invalidate@*".
(2) A user message UM1 (ID="001") is first routed to the first instance IT1 by the load balancer LB (As indicated by arrow AR51).
(3) The processor 110 sets the owner attribute of a generated target context CT1 by the IID/name of the first service instance (e.g., by setting "owner=instance1"), and preserves the target context CT1 in the first local cache LC1 of the first service instance IT1 and sync (store) CT1 into the global cache GC residing in the database 122 (As indicated by arrow AR52).

Figure 6A:
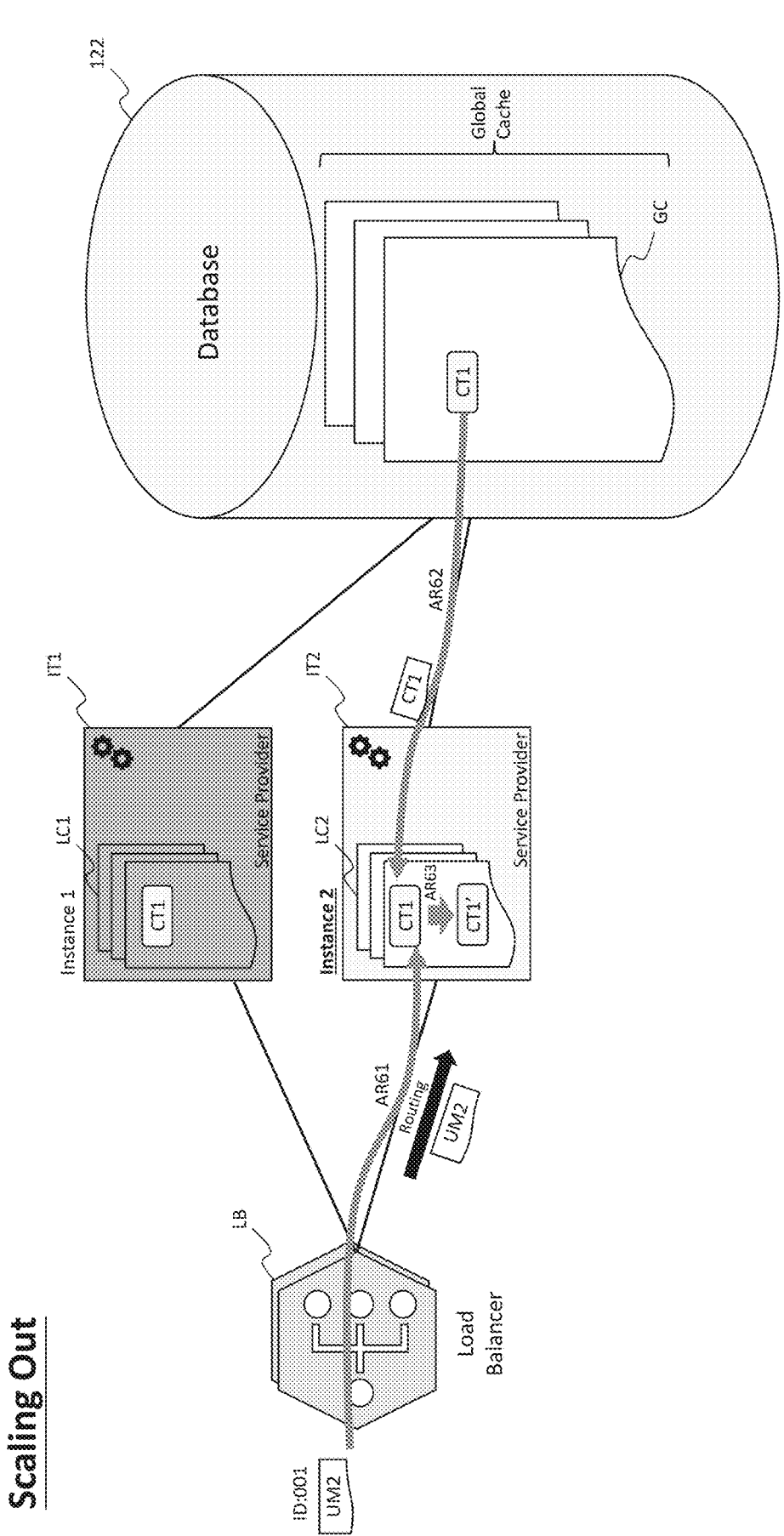
FIGS. 6A and 6B depict schematic diagrams illustrating interactivities performed between load balancer, service instances and database during the scaling-out operation.
Figure 6B:
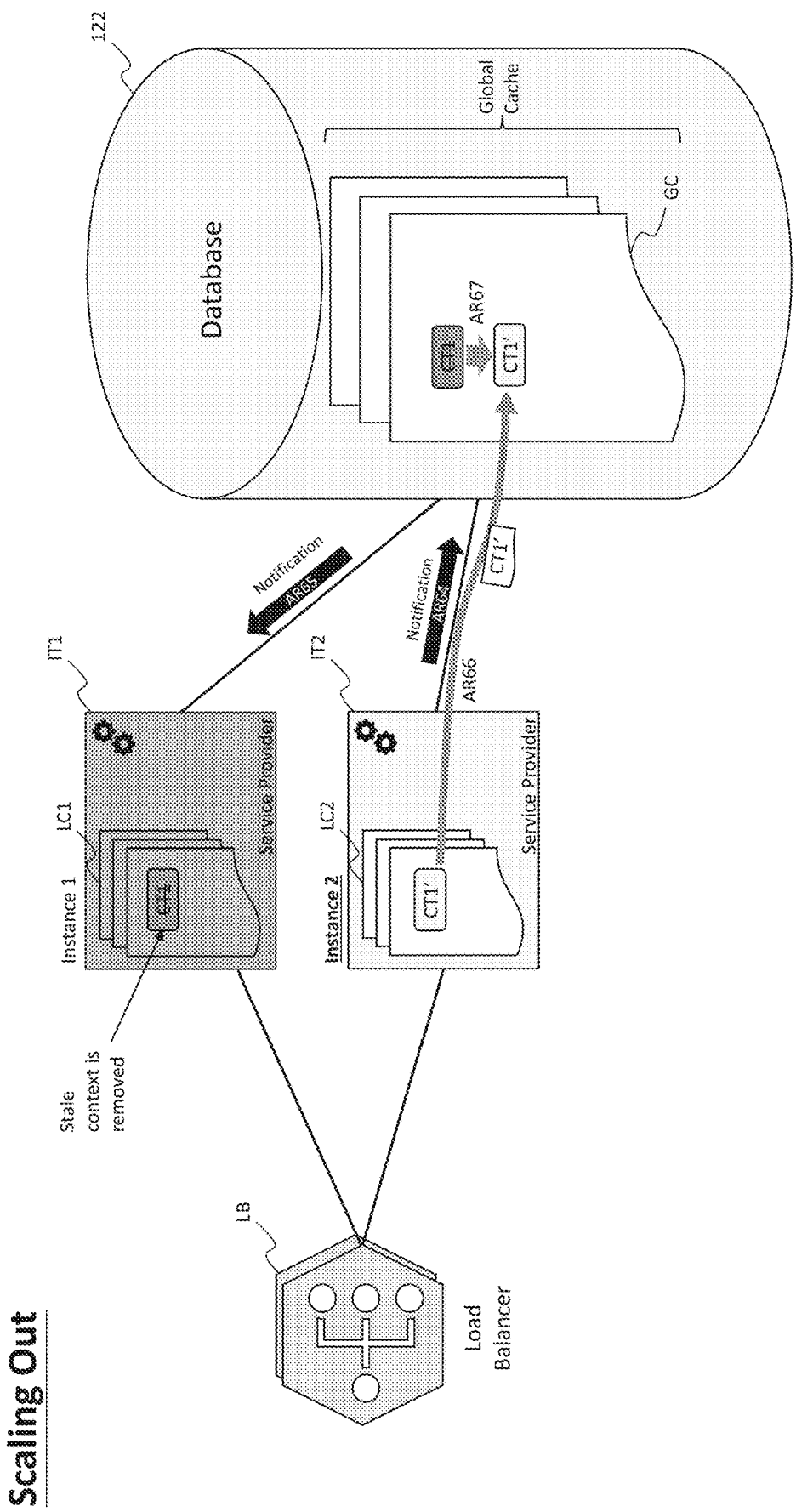

Referring to FIG. 6A and FIG. 6B, during the scaling out operation:
(1) When the first service instance IT1 being scaled out, the auto scaler executed by the processor 110 (not shown) creates a second service instance IT2.
(2) Receive another user message UM2 having the same user ID (e.g., ID="001"), and user message UM2 is routed to the created second service instance IT2 by the load balancer LB (As indicated by arrow AR61). Since the processor 110 determines that the target context CT1 having user ID "001" is save in the global cache GC residing in the database 122, the target context CT1 is read/loaded from the global cache GC and kept in the second local cache LC2 of the second service instance IT2 (as indicated by arrow AR62).
(3) The second service instance CT2 notices that the owner attribute of the target context CT1 is "owner=instance1" which indicates that its owner is not the second instance (e.g., instance1≠instance2), the second service instance sets the owner attribute as "owner=instance2" and updates the target context CT1 to the target context CT1' (As indicated by arrow AR63), stores the updated target context CT1' in the global cache GC (as indicated by arrow AR66) to replace the outdated target context CT1 (as indicated by arrow AR67), publishes (as indicated by arrows AR64 and AR65) the notification event to the database 122 and other service instance (e.g., by sending a command "publish invalidate@001!instance2").
(4) Each subscribed instance (e.g., IT1) receives notification event (e.g., the commend of "invalidate@001!instance2") and deletes the invalid target context (e.g., stale context) from its local cache (e.g., LC1).

Figure 7A:
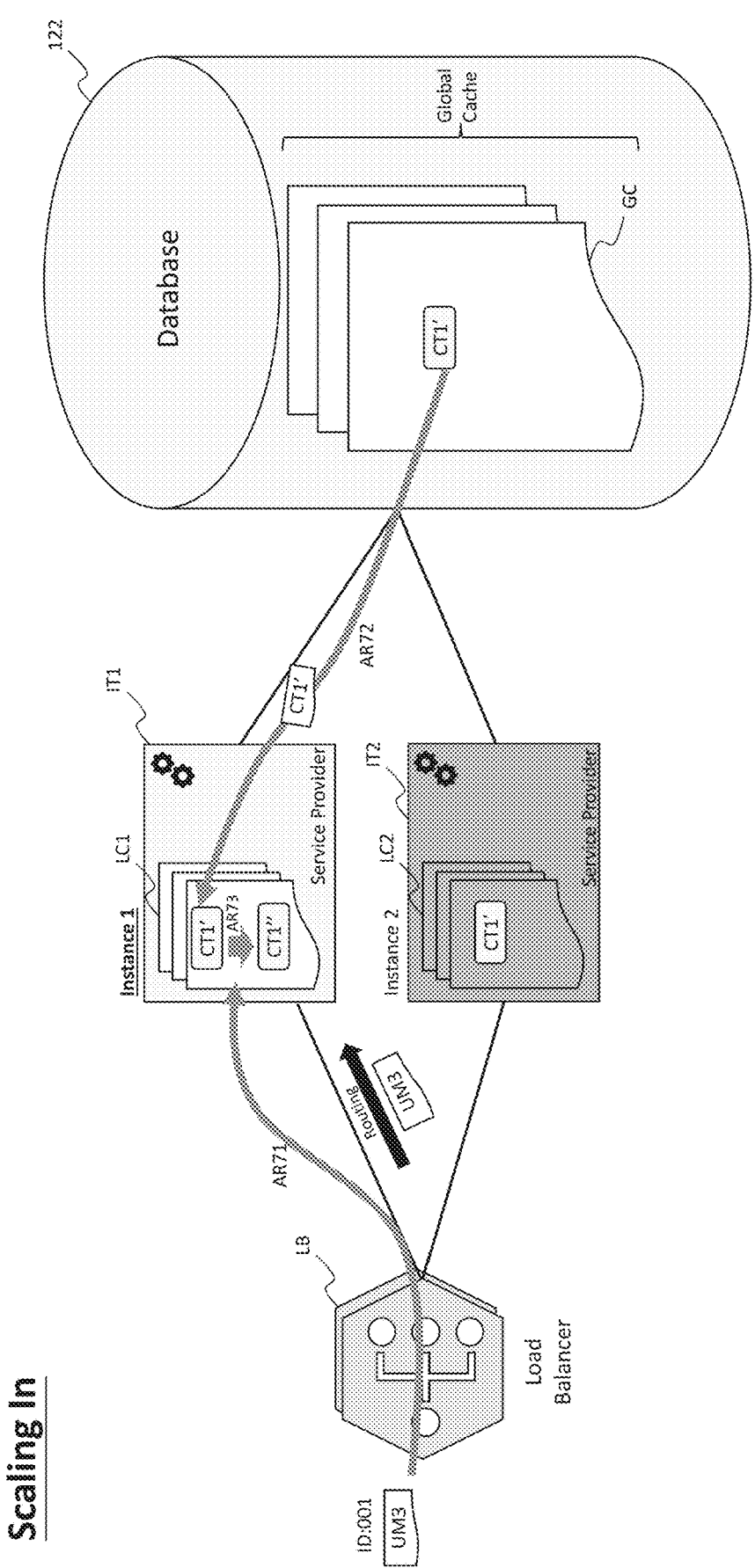
FIGS. 7A and 7B depict schematic diagrams illustrating interactivities performed between load balancer, service instances and database during the scaling-in operation.
Figure 7B:
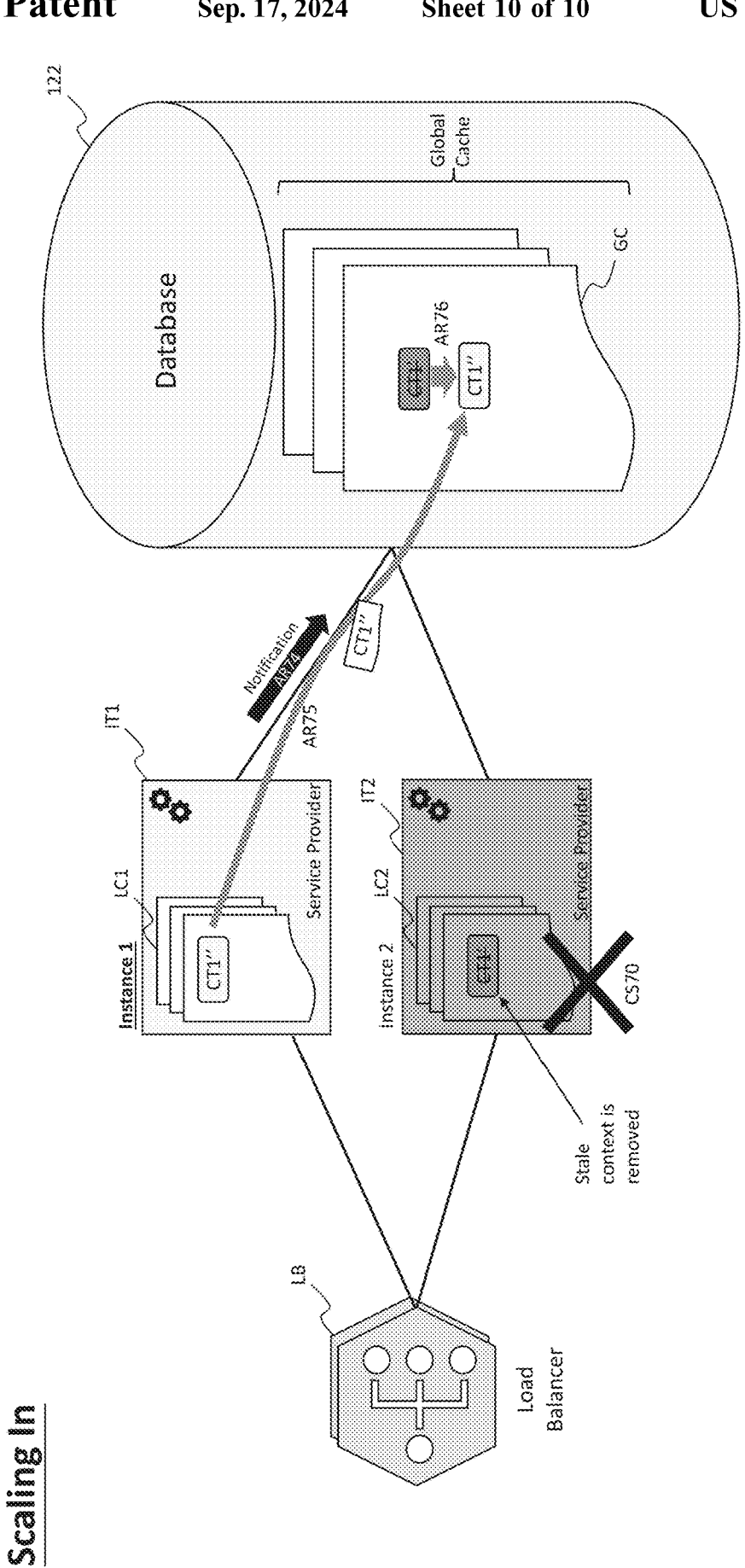

Referring to FIG. 7A and FIG. 7B, during the scaling in operation:
(1) When service being scaled in, the auto scalar removes the second instance IT2 (as indicated by cross sign CS70).
(2) User messages UM is routed back to the original first service instance for handling the user "001" (as indicated by arrow AR71). Since the stale/invalid context CT1 is removed, the first service instance IT1 reads/loads the latest context CT1' from the global cache GC (as indicated by arrow AR72).
(3) When the first service instance updates the target context CT1', it notices that the target context's owner attribute "owner=instance2" does not belong to the first service instance, and the first service instance will set the owner attribute as "owner=instance1" (as indicated by arrow AR73) to obtain updated target context CT1", and stores the target context CT1" in the global cache GC (as indicated by arrow AR75) to replace the outdated target context CT1' (as indicated by arrow AR76). Furthermore, the first service instance publishes (As indicated by arrow AR74) the notification event to the database 122 and/or other service instance (e.g., by sending a command "publish invalidate@001!instance1").

The above exemplary embodiment and operations serve only as illustration of the present invention, and an ordinarily skilled person in the art will appreciate that other structural and functional configurations and applications are possible and readily adoptable without undue experimentation and deviation from the spirit of the present invention.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for removing, by a server, stale context in a service instance providing a microservice to an electronic device, comprising:
   receiving, by a processor of the server, a request data from the electronic device, wherein the request data comprising a UID and a request instruction;
   generating, by the processor, a user message according to the UID and the request instruction, wherein the user message includes a user ID corresponding to the UID;
   routing, by the processor, the user message to a first service instance of the microservice, wherein the first service instance subscribes to an event notification;
   determining whether a target context corresponding to the user ID is saved in a first local cache of the first service instance,
   when the target context corresponding to the user ID is not saved in the first local cache of the first service instance, determining, by the processor, whether a target context corresponding to the user ID saved in a global cache of a database,
   wherein if the target context corresponding to the user ID is not saved in the global cache residing in the database, creating, by the processor, the target context based on the user message; and
   setting, by the processor, the created target context to belong to the first service instance, wherein the target context is saved into a first local cache of the first service instance and into the global cache residing in the database;
   else if the target context corresponding to the user ID is saved in the global cache residing in the database, loading, by the processor, the target context from the global cache;
   determining, by the processor, whether the loaded target context belongs to the first service instance, wherein
   when the loaded target context does not correspond the first service instance,
      setting, by the processor, the loaded target context to belong to the first service instance, wherein the set target context is saved into the first local cache and into the global cache residing in the database; and
      instructing, by the processor, to remove one or more invalid target contexts corresponding to the user ID from one or more other service instances, wherein the invalid target contexts are target contexts which do not belong to the first service instance, such that stale contexts which are the invalid target context are removed.

2. The computer-implemented method of claim 1, after determining whether the target context corresponding to the user ID is saved in the first local cache of the first service instance, the method further comprises:
   when the target context corresponding to the user ID is saved in a first local cache of the first service instance, updating the target context according to the user message and the microservice, and saving the updated target context into a global instance of the database.

3. The computer-implemented method of claim 1, after determining whether the loaded target context belongs to the first service instance, the method further comprises:
   when the loaded target context belongs to the first service instance,
   updating the target context according to the user message and the microservice, and saving the updated target context into a global instance of the database.

4. The computer-implemented method of claim 1, wherein the determination of whether the loaded target context belongs to the first service instance comprises:
   identifying an Instance ID(IID) of the first service instance;
   identifying a content of an owner attribute of the loaded target context; and
   determining whether the content of the owner attribute of the loaded target context is the IID of the first service instance, wherein
   if the content of the owner attribute of the loaded target context is the IID of the first service instance, determining that the loaded target context belongs to the first service instance; else
   if the content of the owner attribute of the loaded target context is not the IID of the first service instance, determining that the loaded target context does not belong to the first service instance.

5. The computer-implemented method of claim 4, wherein the setting of the loaded target context to belong to the first service instance comprises:
   identifying the IID of the first service instance; and
   setting the owner attribute of the loaded target context by the IID of the first service instance, wherein the setting of the created target context to belong to the first service instance comprises:
identifying the IID of the first service instance; and
setting the owner attribute of the created target context by the IID of the first service instance.

6. The computer-implemented method of claim 1, wherein the instructing to remove the invalid target contexts corresponding to the user ID from the other service instances comprises:
publishing a notification event related to target context corresponding to the user ID to all other service instances, wherein the notification event indicating that target context not belonging to the first service instance is invalid; and
for one service instance having the invalid target context, after receiving the notification event, removing the invalid target context from a local cache of that said one service instance.

7. The computer-implemented method of claim 6, wherein the publishing of the notification event related to target context corresponding to the user ID to all other service instances comprises:
sending the notification event to the database; and
forward the notification event to all other service instances.

8. A server for removing stale context in a service instance providing a microservice to an electronic device, comprising:
a non-transient memory circuit, configured to store machine instructions, and a database; and
a processor, configured to execute machine instructions to implement a method to remove the stale context in the service instance, wherein the service instance is executed and managed by the processor, and the method comprises:
receiving, by the processor, a request data from the electronic device, wherein the request data comprising a UID and a request instruction;
generating, by the processor, a user message according to the UID and the request instruction, wherein the user message includes a user ID corresponding to the UID;
routing, by the processor, the user message to a first service instance of the microservice, wherein the first service instance subscribes an event notification;
determining whether a target context corresponding to the user ID is saved in a first local cache of the first service instance,
when the target context corresponding to the user ID is not saved in the first local cache of the first service instance, determining, by the processor, whether a target context corresponding to the user ID saved in a global cache residing in the database,
wherein if the target context corresponding to the user ID is not saved in the global cache residing in the database, creating, by the processor, the target context based on the user message; and
setting, by the processor, the created target context to belong to the first service instance, wherein the target context is saved into a first local cache of the first service instance and into the global cache residing in the database;
else if the target context corresponding to the user ID is saved in the global cache residing in the database, loading, by the processor, the target context from the global cache;
determining, by the processor, whether the loaded target context belongs to the first service instance, wherein
when the loaded target context does not correspond the first service instance,
setting, by the processor, the loaded target context to belong to the first service instance, wherein the set target context is saved into the first local cache and into the global cache residing in the database; and
instructing, by the processor, to remove one or more invalid target contexts corresponding to the user ID from one or more other service instances, wherein the invalid target contexts are target contexts which do not belong to the first service instance, such that stale contexts which are the invalid target context are removed.

9. The server of claim 8, after determining whether the target context corresponding to the user ID is saved in the first local cache of the first service instance, the method further comprises:
when the target context corresponding to the user ID is saved in a first local cache of the first service instance,
updating the target context according to the user message and the microservice, and saving the updated target context into a global instance of the database.

10. The server of claim 8, after determining whether the loaded target context belongs to the first service instance, the method further comprises:
when the loaded target context belongs to the first service instance,
updating the target context according to the user message and the microservice, and saving the updated target context into a global instance of the database.

11. The server of claim 8, wherein the determination of whether the loaded target context belongs to the first service instance comprises:
identifying an Instance ID (IID) of the first service instance;
identifying a content of an owner attribute of the loaded target context; and
determining whether the content of the owner attribute of the loaded target context is the IID of the first service instance, wherein
if the content of the owner attribute of the loaded target context is the IID of the first service instance, determining that the loaded target context belongs to the first service instance; else
if the content of the owner attribute of the loaded target context is not the IID of the first service instance, determining that the loaded target context does not belong to the first service instance.

12. The server of claim 11, wherein the setting of the loaded target context to belong to the first service instance comprises:
identifying the IID of the first service instance; and
setting the owner attribute of the loaded target context by the IID of the first service instance,
wherein the setting of the created target context to belong to the first service instance comprises:
identifying the IID of the first service instance; and
setting the owner attribute of the created target context by the IID of the first service instance.

13. The server of claim 8, wherein the instructing to remove the invalid target contexts corresponding to the user ID from the other service instances comprises:
publishing a notification event related to target context corresponding to the user ID to all other service instances, wherein the notification event indicating that target context not belonging to the first service instance is invalid; and for one service instance having the invalid target context, after receiving the notification event, removing the invalid target context from a local cache of that said one service instance.

14. The server of claim 13, wherein the publishing of the notification event related to target context corresponding to the user ID to all other service instances comprises:
sending the notification event to the database; and
forward the notification event to all other service instances.

15. A system for removing stale context in a service instance providing a microservice, comprising:
an electronic device; and
a server, wherein the server comprises:
a non-transient memory circuit, configured to store machine instructions, and a database, and
a processor,
wherein the electronic device sends a request data to the server,
wherein the processor is configured to execute machine instructions to implement a method to remove the stale context in the service instance, wherein the service instance is executed and managed by the processor, and the method comprises:
receiving, by the processor, the request data, wherein the request data comprising a UID and a request instruction;
generating, by the processor, a user message according to the UID and the request instruction, wherein the user message includes a user ID corresponding to the UID;
routing, by the processor, the user message to a first service instance of the microservice, wherein the first service instance subscribes an event notification;
determining whether a target context corresponding to the user ID is saved in a first local cache of the first service instance, when the target context corresponding to the user ID is not saved in the first local cache of the first service instance, determining, by the processor, whether a target context corresponding to the user ID saved in a global cache of the database, wherein if the target context corresponding to the user ID is not saved in the global cache of the database,
creating, by the processor, the target context based on the user message; and
setting, by the processor, the created target context to belong to the first service instance, wherein the target context is saved into a first local cache of the first service instance and into the global cache residing in the database;

else if the target context corresponding to the user ID is saved in the global cache residing in the database,
loading, by the processor, the target context from the global cache;
determining, by the processor, whether the loaded target context belongs to the first service instance, wherein when the loaded target context does not correspond the first service instance,
setting, by the processor, the loaded target context to belong to the first service instance, wherein the set target context is saved into the first local cache and into the global cache residing in the database; and
instructing, by the processor, to remove one or more invalid target contexts corresponding to the user ID from one or more other service instances, wherein the invalid target contexts are target contexts which do not belong to the first service instance, such that stale contexts which are the invalid target context are removed.

* * * * *